United States Patent [19]

Gillet

[11] 4,156,805

[45] May 29, 1979

[54] MACHINE FOR HEAT TREATING OBJECTS OF GREAT LENGTH

[75] Inventor: Bernard Gillet, Rosny-sous-Bois, France

[73] Assignee: Agence Nationale de Valorisation de la Recherche (ANVAR), Neuilly-sur-Seine, France

[21] Appl. No.: 795,721

[22] Filed: May 11, 1977

[30] Foreign Application Priority Data

May 14, 1976 [FR] France ................................ 76 14607

[51] Int. Cl.[2] ......................... B23K 13/02; H05B 9/04; B23B 1/04

[52] U.S. Cl. ................................. 219/10.53; 144/327; 144/309 B; 144/317; 156/380; 156/443; 219/10.81

[58] Field of Search ............... 219/10.81, 10.73, 10.61, 219/10.53; 156/380, 443; 144/327, 309 B, 309 D, 317; 264/26

[56] References Cited

U.S. PATENT DOCUMENTS

| | | | |
|---|---|---|---|
| 2,563,098 | 8/1951 | Brown | 219/10.53 |
| 2,783,344 | 2/1957 | Warren | 219/10.81 |
| 3,149,217 | 9/1964 | Reed et al. | 219/10.53 |
| 3,888,715 | 6/1975 | Fraser et al. | 219/10.53 |
| 4,035,223 | 7/1977 | Russell | 156/380 |

*Primary Examiner*—Bruce A. Reynolds

[57] ABSTRACT

The machine comprises two electrodes connected to a high frequency electric current generator and adapted to subject the object to be heated to an electric field. The first electrode comprises a table provided with at least one opening through which projects a roll for guiding the travel of the object. A plurality of pairs of electrically insulating rollers for exerting pressure on the object are mounted on the table and at least one pair is movable with respect to the others so as to curve the object as heat treatment proceeds. Section members supporting the rollers extend the table of the electrode and are in electric contact with a support box structure for the second electrode which is connected to earth.

12 Claims, 4 Drawing Figures

MACHINE FOR HEAT TREATING OBJECTS OF GREAT LENGTH

The present invention relates to the heat treatment of objects by means of a high frequency energy applied by electrodes and more particularly to the treatment of objects of wood formed from sheets or strips which are adhered to each other throughout their length.

Installations at present employed for carrying out this type of heat treatment comprise electrodes connected to a high frequency electric current generator between which a fixed object is placed. To treat objects of relatively large size, it has been contemplated to displace one of the electrodes along the object, but such a displacement does not allow the treatment of beams or other objects of very great length. Moreover, the displacement of the object itself is rendered difficult by the fact that it produces unevenness in the electric field which results in an uneven heating and consequently an unreliable result.

An object of the present invention is to overcome these drawbacks by providing a heat treating machine whereby it is possible to treat objects irrespective of their length, and to displace them without fear of unevenness in the electric field. Moreover, this machine permits not only ensuring the adhesion of the different sheets or strips of which the object is constituted but also shaping the latter, for example by imparting thereto a suitable curvature.

According to the invention, there is provided a heat treating machine comprising two electrodes connected to a high frequency generator and adapted to apply an electric field, in which the first electrode comprises a table provided with at least one opening through which projects a roll for guiding the travel of the object and supporting freely rotatable electrically insulating rollers for exerting a lateral pressure on the object.

According to a preferred embodiment, the machine comprises three side by side adjacent presses each of which presses comprises a table carrying two rollers for applying a pressure on the object, the two outer presses being fixed whereas the center press is transversely movable a distance which is adjustable in accordance with the offset that is desired to be obtained between the rollers thereof and the rollers of the two neighbouring presses, that is to say in accordance with the curvature to be imparted to the object.

According to another feature of the invention, the first electrode is constituted by the table carrying the lateral rollers which is extended by the supports for said rollers and is in close contact with a box structure for supporting the second electrode, which box structure is connected to the earth of the generator.

Such a machine permits treating extremely long objects which are subjected to the action of the pressure-applying rollers and can either be maintained rectilinear or receive an appropriate curvature. Moreover, the fact that the electrode formed by the table of the machine is electrically connected to the box structure of the second electrode and thus forms a substantially closed assembly, permits obtaining a well defined and substantially constant electric field at any moment of the treatment, which considerably reduces the risk of unevenness in the heating.

The following description of one embodiment, given solely by way of example and shown in the accompanying drawings, will bring out the advantages and features of the invention.

Figure 1:
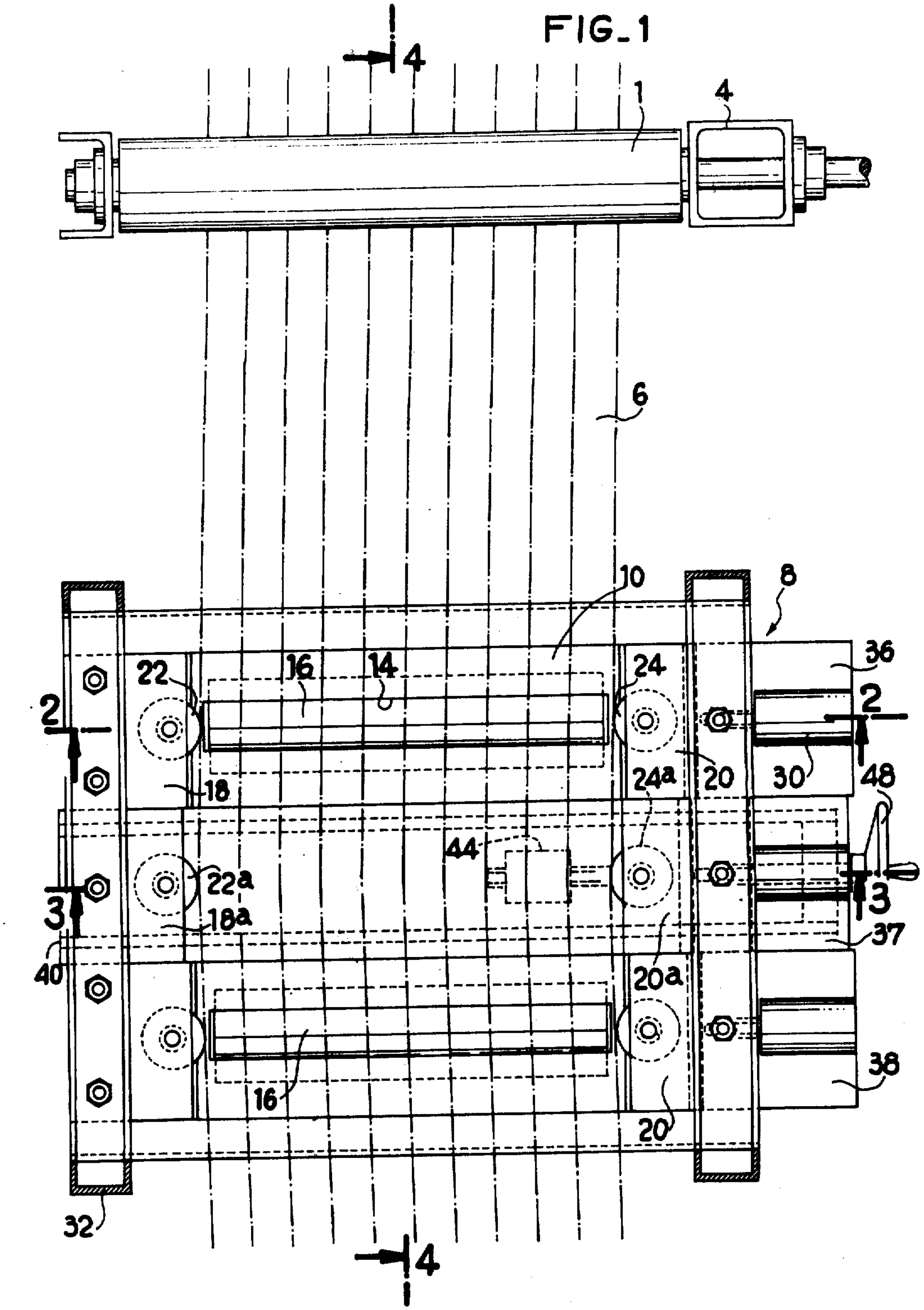
FIG. 1 is a plan view of an installation comprising a heat treating machine according to the invention, the upper electrode of which has been removed.

The installation shown in the drawings is more particularly adapted to the heat treatment of objects of very great length which are supported and driven by rolls 1, 2 mounted on supports 4. These rolls are preferably grooved so as to drive the object 6 to be treated. Moreover, some thereof are driving rollers.

Figure 2:
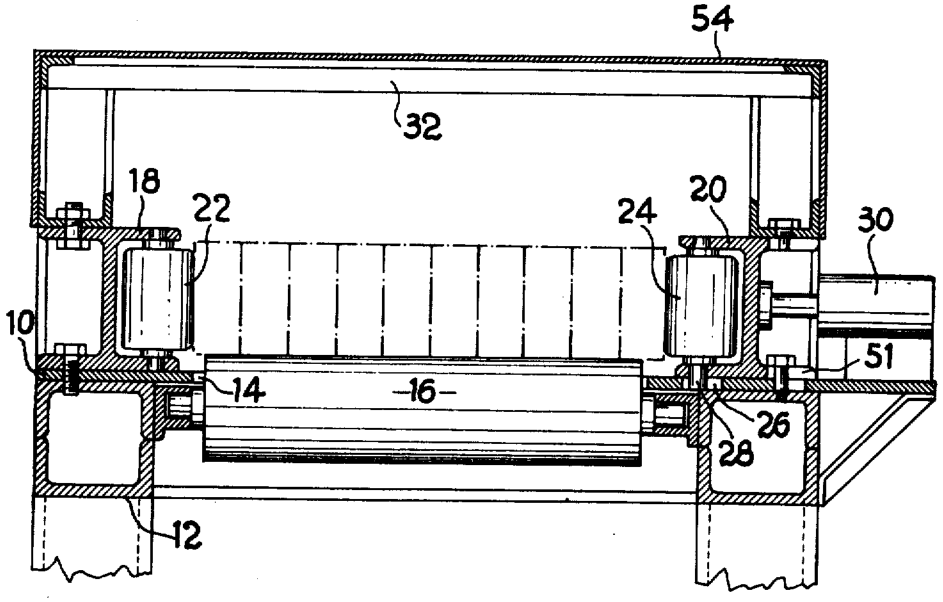
FIG. 2 is a sectional view taken on line 2—2 of FIG. 1.

The object 6 is introduced into a heat treating machine designated by the reference numeral 8. This machine comprises two electrodes connected to a high frequency generator. The first electrode is constituted by a table 10 (FIG. 2) which is secured to a frame 12 and provided with at least one opening 14 from which projects a roll 16 which is freely rotatably mounted on the frame 12. The roll or rolls 16 are parallel to the rolls 1 and 2 and guide the object 6 which travels through the machine 8.

The table 10 carries on each side of the opening 14 I-section members 18, 20 respectively in which electrically insulating rollers 22, 24 are mounted and are freely rotatable on spindles perpendicular to the table 10. Moreover, the members 18 are fixed to the table 10 whereas, at the opposite end, the members 20 may be displaced with respect to the table 10 owing to th provision of an opening 26 which is formed in the table and in which an extension 28 of the spindle of the roller 24 is movable. A jack 30 secured to the table 10 controls the position of the member 20 and thus enables the object 6 to be pressed in a suitable manner between the rollers 22 and 24. The members 18 and 20 are in contact with a framework 32 which supports a second electrode 34 connected to the high frequency generator (not shown). The object 6 is thus subjected as it passes through the rollers 22 and 24 to the high frequency energy from the two electrodes and is thereby treated.

Figure 3:
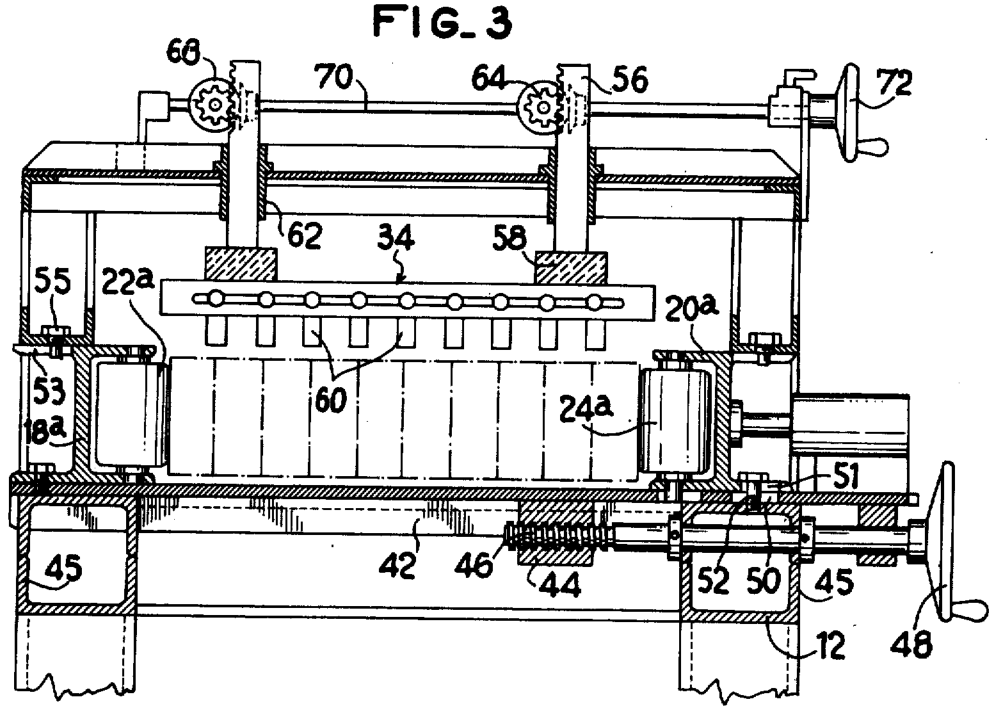
FIG. 3 is a sectional view taken on line 3—3 of FIG. 1.

Preferably, the machine 8 is constituted by three assembled adjacent presses 36, 37 and 38 (FIG. 1). The two end presses 36 and 38 are secured to the frame 12 and each comprise a portion of the table 10 provided with an opening 14 for the passage of a roll 16 for guiding the object. On the other hand, the center press 37 has a table portion 40 devoid of an opening and supported by the frame 12 in such manner as to be slidable between the two tables 10 of the presses 36 and 38. The table 40 has in its lower part two guiding flanges 42 which are slidable in slots 43 formed in two opposed girders 45 of the frame 12 and integral with a nut 44 which cooperates with a screwthreaded rod 46 held axially stationary in one of the girders 45 (FIG. 3). A hand wheel 48 manually controls the displacement of the nut 44 and consequently the table 40. This displacement is limited by an opening 50 formed in the table 40 and cooperating with a screw or lug 52 integral with the frame 12. The screw 52 extends through an opening 51 in the section member 20$^a$ supporting the adjustable roller 24 so that this roller may be shifted, on one hand, together with the whole of the press 37 on the frame 12 so long as the jack 30 maintains the relative positions of the member 20 and table 10 constant and, on the other hand, independently of the other parts along the table 40 when the jack 30 comes into action. Openings 53 formed in the section members 18 and 20$^a$ and cooperating with screws 55 fixed in the framework 32, enable the section members to be shifted with respect to this framework which is fixed.

The travel of the table 40 is relatively limited since a small offsetting of the rollers 24$^a$ and 22$^a$ with respect to the rollers 22 and 24 is sufficient to impart a relatively large curvature to the treated object. The travel of the table 40 may be of the order of 1 to 2 cm on each side of the position of alignment with the fixed presses.

Figure 4:
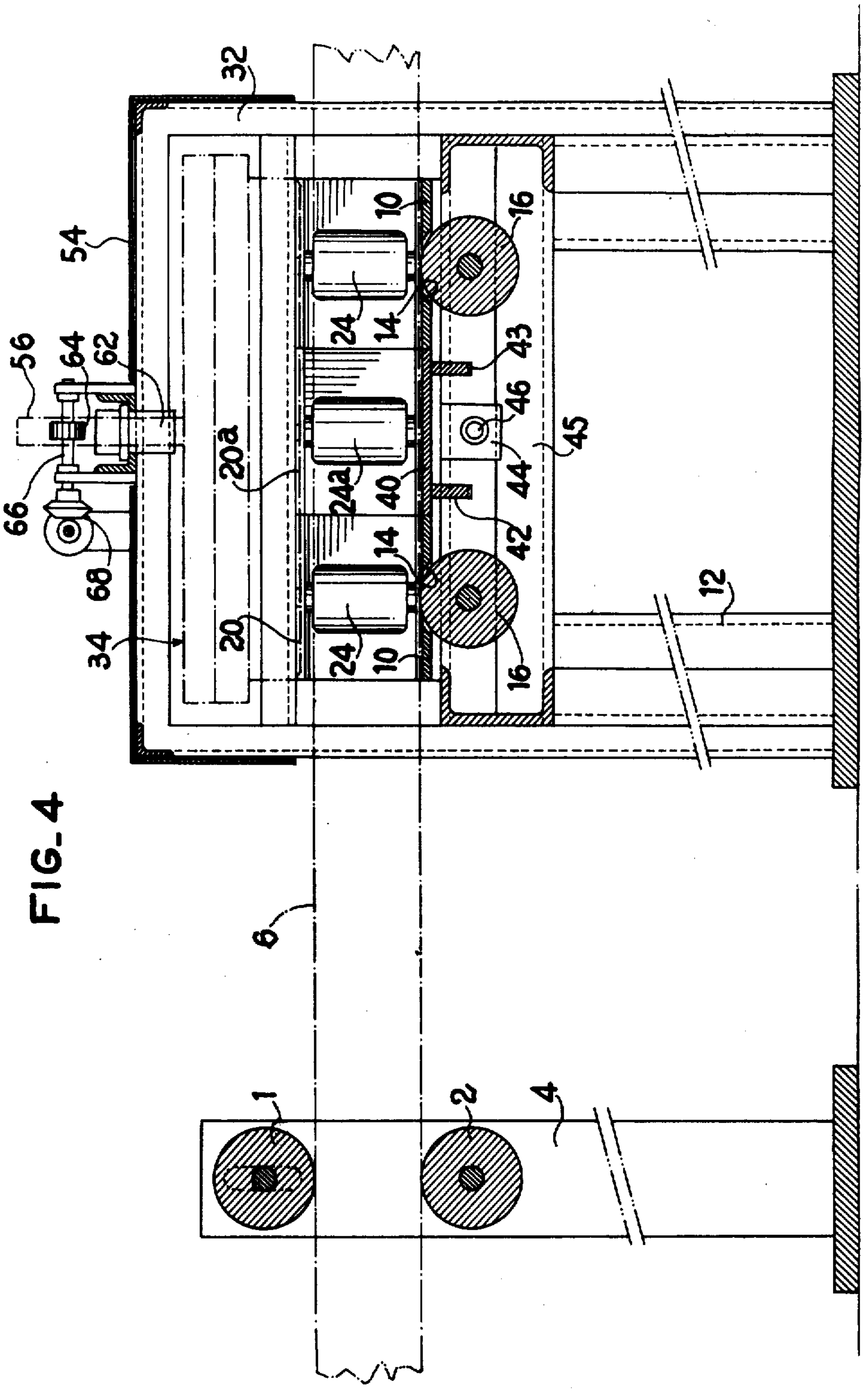
FIG. 4 is a sectional view taken on line 4—4 of FIG. 1.

In all its positions, the movable press is firmly supported and remains in close contact with the fixed preses. As shown in FIG. 4 the object 6 is very slightly spaced from the tables 10 owing to the projection of the rolls 16 above these tables 10.

Note that the table 40 could be situated at a level intermediate between that of the tables 10 and that of the rollers 16.

The combination of the force exerted by the rollers with the heating produced by the electrodes deforms the strips or sheets of the object 6 at the same time as it causes them to adhere to one another.

The section members 18, 20 are in electric contact with the table 10 and the section members 18$^a$, 20$^a$ always remain in electric contact with the table 40, so that the tables 10 and 40 combined with the electrically conductive rolls 16 form a continuous electrode even when the table 40 is displaced. Moreover, in their upper part, the members 18$^a$ and 20$^a$ are, in the same way as the members 18 and 20, electrically connected to the framework 32 which supports the second electrode. This framework is preferably provided with a shrouding or screen 54 which is connected to the earth of the frequency generator so that the first electrode is absolutely continuous all around the object and the second electrode.

The shrouding 54 and the framework 32 have extending therethrough two racks 56 which are connected by insulating members 58 to the electrode 34. The latter is constituted in the conventional manner by a frame in which downwardly extending vertical plates 60 are mounted, the number of plates being substantially equal to the lines of junction between the strips of which the object 6 is composed. Each of the racks 56 extends through a metal sleeve 62 integral with the framework 32 and is engaged with a gear pinion 64 mounted on a shaft 66 which terminates in a gear pinion 68 engaged with a screwthreaded rod 70 constituting the general drive. A handle 72 permits the manual adjustment of the position of the electrode 34, that is to say its raising when the object is introduced and its lowering to the vicinity of the object for the treatment.

In the course of the treatment, the part of the object which is subjected thereto is surrounded by the substantially closed enclosure, constituted by the earth electrode, that is to say the tables 10 or 40, the I-section members supporting the rollers, the framework 32 and possibly the shrouding 54, and is located at a well-determined distance from the high frequency electrode. Consequently, the electric field around the object 6 is substantially constant and may be defined in a precise manner in accordance with the treatment to be effected.

The length of the plates 60 is about that of the electrode formed by the assembly of tables 10 and 40, so that the treatment is continued throughout the travel of the object through the machine 8. When the rollers 24 and 24$^a$, or 22, 22$^a$, are in alignment, the plates 60 substantially correspond to the gaps between the strips. When the object is being curved, these gaps have a slight offset with respect to the plates 60 but this offset remains small with respect to the width of these plates so that the treatment conserves its full effectiveness.

Moreover, it has been observed that this treatment is not hindered by the displacement of the movable press so that it is possible to form beams or other members of various configurations with no risk of any unevenness in the treatment.

It will be understood that the number of fixed and movable presses is chosen in accordance with the treatment and the desired curvature. Several movable presses may be for example assembled side by side or in alternating relation with fixed presses. The object may be made to move through the machine by articulated tracks, even disposed within the machine, instead of by outer grooved rolls 1 and 2, and provided with insulating rollers in contact with the object and passing around adjusting rollers of the various presses.

Having now described my invention what I claim as new and desire to secure by Letters Patent is:

1. A machine for heat treating an object of great length, comprising means for passing the object longitudinally through the machine, two electrodes for connection to a high frequency electric current generator and for applying an electric field to the object to be heated, a first electrode of said electrodes comprising table means having a given longitunal extent and defining at least one opening and having a surface for location adjacent to the object, a roll projecting through the opening and mounted relative to the table means to rotate about an axis extending transversely of the table means for guiding the object in spaced relation to said surface in a path substantially perpendicular to the axis of rotation of the roll, and electrically insulating rollers supported by the table means to rotate about axes substantially perpendicular to said surface for applying a lateral pressure on the object, a second of said electrodes being mounted in spaced relation to the table means and having a longitudinal extent which is a major part of said longitudinal extent of the table means and extending substantially in a direction perpendicular to the axis of rotation of the roll and substantially parallel to said surface of the table means for positioning in spaced relation to the object.

2. A machine as claimed in claim 1, comprising at least three pairs of said pressure applying rollers, and means for varying the position of at least one of said pairs of pressure applying rollers transversely of the other pairs of rollers.

3. A machine as claimed in claim 2, wherein each pair of rollers comprises a roller mounted on a fixed spindle and a second roller mounted on a spindle which is movable relative to the table means in accordance with the desired pressure to be applied on the object.

4. A machine as claimed in claim 3, comprising a jack fixed to the table of the press and comprising a jack rod, the section member pertaining to the adjustable roller being connected to the rod of the jack, and the section member pertaining to the fixed roller being fixed to the table.

5. A machine for heat treating an object of great length, comprising a frame, means for passing the object longitudnally through the machine, two electrodes for connection to a high frequency electric current generator and for applying an electric field to the object to be heated, a first electrode of said electrodes comprising table means defining at least one opening, a roll projecting through the opening for guiding the object, and electrically insulating rollers supported by the table means for applying a lateral pressure on the object, said table means comprising at least three tables which are respectively part of at least three presses arranged side by side longitudinally of the machine, namely a center press and two outer presses, each of said tables supporting two of said pressure applying rollers, the tables of the two outer presses being fixed to the frame and the table of the center press being movable with respect to the other tables transversely of the machine a distance which is adjustable in accordance with a curvature to be imparted to the object.

6. A machine as claimed in claim 5, wherein the table of the movable press is slidably mounted on the frame, and a nut secured to the table of the movable press is screwthreadedly engaged on a screw which is held axially stationary on the frame for shifting the table of the movable press.

7. Machine for heat treating objects of great length, comprising means for passing the object longitudinally through the machine, two electrodes for connection to a high frequency electric current generator and for applying an electric field to the object to be heated, a first electrode of said electrodes comprising table means having a given longitudinal extent and defining at least one opening and having a surface for location adjacent the object, an electrically conductive roll projecting through the opening and mounted relative to the table means to rotate about an axis extending transversely of the table means for guiding the object in spaced relation to said surface in a path substantially perpendicular to the axis of rotation of the roll, electrically conductive section members laterally extending the table means, electrically insulating rollers supported on the section members to rotate about axes substantially perpendicular to said surface for applying lateral pressure on the object, a fixed electrically conductive box structure for supporting a second of said two electrodes, the section members being in electrical contact with the table means and with the box structure, said second electrode being mounted in spaced relation to said surface and having a longitudinal extent which is a major part of said longitudinal extent of the table means and extending substantially in a direction perpendicular to the axis of rotation of the roll and substantially parallel to said surface for positioning in spaced relation to the object.

8. A machine as claimed in claim 7, wherein the second electrode is carried by the box structure with interposition of electrically insulating means.

9. A machine as claimed in claim 7, wherein the box structure comprises a framework which supports the second electrode and a shrouding connected to earth covers the framework, the roll and the table means also being connected to earth.

10. A machine for heat treating objects of great length, comprising two electrodes for connection to a high frequency electric current generator and for applying an electric field to the object to be heated, a first electrode of said electrodes comprising a table defining at least one opening, an electrically conductive roll projecting through the opening for guiding the travel of the object, section members laterally extending the table, electrically insulating rollers supported on the section members for applying lateral pressure on the object, a fixed box structure for supporting a second of said two electrodes, the section members being in electrical contact with the box structure, the first electrode comprising two outer parts constituting the tables of two fixed presses and a center part which is part of a movable press which is slidable along the two fixed parts, means being provided to ensure an electric contact between the center part and the two fixed tables, irrespective of the position of the center part.

11. A machine as claimed in claim 10, wherein the section members for supporting the rollers of the movable press are movable by displacement of the table and are slidable with respect to the fixed box structure but capable of remaining in electric contact with the box structure.

12. A machine as claimed in claim 11, wherein the section members and the box structure are interconnected by means comprising a screw and means defining an opening in which opening the screw is movably mounted.

* * * * *